United States Patent
Qin et al.

(10) Patent No.: US 9,364,859 B2
(45) Date of Patent: *Jun. 14, 2016

(54) SUPERHYDROPHOBIC SURFACES

(75) Inventors: Jian Qin, Appleton, WI (US); Donald E. Waldroup, Roswell, GA (US); Constantine M. Megaridis, Oak Park, IL (US); Thomas M. Schutzius, Tinley Park, IL (US); Ilker S. Bayer, Arnesano (IT)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 674 days.

This patent is subject to a terminal disclaimer.

(21) Appl. No.: 13/193,065

(22) Filed: Jul. 28, 2011

(65) Prior Publication Data
US 2013/0029551 A1 Jan. 31, 2013

(51) Int. Cl.
*B32B 5/02* (2006.01)
*B05D 5/08* (2006.01)
(Continued)

(52) U.S. Cl.
CPC .............. *B05D 5/083* (2013.01); *B32B 5/022* (2013.01); *B32B 27/308* (2013.01); *D06M 11/44* (2013.01); *D06M 15/256* (2013.01); *D06M 15/295* (2013.01); *D06M 23/08* (2013.01);
(Continued)

(58) Field of Classification Search
CPC ........ B82Y 30/00; B05D 5/083; B32B 5/022; B32B 27/308; B32B 2262/067; B32B 2555/00; D06M 11/44; D06M 15/256; D06M 15/295; D06M 23/08; D21H 27/002; D21H 15/02; D21H 17/11; D21H 17/33; D21H 17/67; D21H 17/675; D21H 17/68; D21H 17/74; D21H 19/34; D21H 19/385; D21H 19/40; D21H 19/56; D21H 21/16; D21H 21/52; Y10T 428/31935; Y10T 428/31667; Y10T 428/31645; Y10T 428/2164
USPC .............. 442/79, 82, 85, 88, 93, 94; 977/773, 977/775, 778, 779, 783, 961
See application file for complete search history.

(56) References Cited

U.S. PATENT DOCUMENTS 3,338,992 A 8/1967 Kinney
3,341,394 A 9/1967 Kinney
(Continued)

FOREIGN PATENT DOCUMENTS

CN 1830909 A 9/2006
CN 101250597 A 8/2008
(Continued)

OTHER PUBLICATIONS

Bhushan, Bharat and Eun Kyu Her, "Fabrication of Superhydrophobic Surfaces with High and Low Adhesion Inspired from Rose Petal," Langmuir, vol. 26, No. 11, 2010, pp. 8207-8217.
(Continued)

*Primary Examiner* — Jeremy R Pierce
(74) *Attorney, Agent, or Firm* — Kimberly-Clark Worldwide, Inc.

(57) ABSTRACT

The present invention relates to a surface of a substrate, or the substrate itself, exhibiting superhydrophobic characteristics when treated with a formulation comprising a hydrophobic component, nano-structured particles and water. The superhydrophobicity can be applied either over the entire surface, patterned throughout or on the substrate material, and/or directly penetrated through the z-directional thickness of the substrate material.

15 Claims, 7 Drawing Sheets

(51) Int. Cl.

| | |
|---|---|
| B32B 27/30 | (2006.01) |
| D06M 11/44 | (2006.01) |
| D06M 15/256 | (2006.01) |
| D06M 15/295 | (2006.01) |
| D06M 23/08 | (2006.01) |
| D21H 27/00 | (2006.01) |
| D21H 15/02 | (2006.01) |
| D21H 17/11 | (2006.01) |
| D21H 17/33 | (2006.01) |
| D21H 17/67 | (2006.01) |
| D21H 17/68 | (2006.01) |
| D21H 17/00 | (2006.01) |
| D21H 19/34 | (2006.01) |
| D21H 19/38 | (2006.01) |
| D21H 19/40 | (2006.01) |
| D21H 19/56 | (2006.01) |
| D21H 21/16 | (2006.01) |
| D21H 21/52 | (2006.01) |
| B82Y 30/00 | (2011.01) |

(52) U.S. Cl.
CPC .............. *D21H 15/02* (2013.01); *D21H 17/11* (2013.01); *D21H 17/33* (2013.01); *D21H 17/67* (2013.01); *D21H 17/675* (2013.01); *D21H 17/68* (2013.01); *D21H 17/74* (2013.01); *D21H 19/34* (2013.01); *D21H 19/385* (2013.01); *D21H 19/40* (2013.01); *D21H 19/56* (2013.01); *D21H 21/16* (2013.01); *D21H 21/52* (2013.01); *D21H 27/002* (2013.01); *B32B 2262/067* (2013.01); *B32B 2555/00* (2013.01); *B82Y 30/00* (2013.01); *Y10T 428/31645* (2015.04); *Y10T 428/31667* (2015.04); *Y10T 428/31935* (2015.04); *Y10T 442/2164* (2015.04)

(56) References Cited

U.S. PATENT DOCUMENTS

| | | |
|---|---|---|
| 3,494,821 A | 2/1970 | Evans |
| 3,502,763 A | 3/1970 | Hartmann |
| 3,542,615 A | 11/1970 | Dobo et al. |
| 3,574,791 A | 4/1971 | Sherman et al. |
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| 4,100,324 A | 7/1978 | Anderson et al. |
| 4,144,370 A | 3/1979 | Boulton |
| 4,340,563 A | 7/1982 | Appel et al. |
| 4,659,609 A | 4/1987 | Lamers et al. |
| 4,833,003 A | 5/1989 | Win et al. |
| 5,048,589 A | 9/1991 | Cook et al. |
| 5,108,820 A | 4/1992 | Kaneko et al. |
| 5,108,827 A | 4/1992 | Gessner |
| 5,284,703 A | 2/1994 | Everhart et al. |
| 5,294,482 A | 3/1994 | Gessner |
| 5,336,552 A | 8/1994 | Strack et al. |
| 5,350,624 A | 9/1994 | Georger et al. |
| 5,382,400 A | 1/1995 | Pike et al. |
| 5,399,412 A | 3/1995 | Sudall et al. |
| 5,468,598 A | 11/1995 | Miller et al. |
| 5,510,001 A | 4/1996 | Hermans et al. |
| 5,539,021 A | 7/1996 | Pate et al. |
| 5,591,309 A | 1/1997 | Rugowski et al. |
| 5,620,779 A | 4/1997 | Levy et al. |
| D390,708 S | 2/1998 | Brown |
| 5,759,926 A | 6/1998 | Pike et al. |
| 5,935,883 A | 8/1999 | Pike |
| 5,962,112 A | 10/1999 | Haynes et al. |
| 6,017,417 A | 1/2000 | Wendt et al. |
| D428,267 S | 7/2000 | Sayovitz et al. |
| 6,093,665 A | 7/2000 | Sayovitz et al. |
| 6,103,061 A | 8/2000 | Anderson et al. |
| 6,197,404 B1 | 3/2001 | Varona |
| 6,200,669 B1 | 3/2001 | Marmon et al. |
| 6,315,864 B2 | 11/2001 | Anderson et al. |
| 6,432,270 B1 | 8/2002 | Liu et al. |
| 7,087,662 B2 | 8/2006 | Ghosh et al. |
| 7,732,497 B2 | 6/2010 | Cumberland et al. |
| 2002/0045010 A1* | 4/2002 | Rohrbaugh et al. ........ 427/372.2 |
| 2004/0077770 A1 | 4/2004 | Zaghib et al. |
| 2005/0100754 A1 | 5/2005 | Moncla et al. |
| 2005/0205830 A1 | 9/2005 | Oles et al. |
| 2005/0229327 A1 | 10/2005 | Casella et al. |
| 2006/0172641 A1* | 8/2006 | Hennige et al. ................. 442/59 |
| 2007/0027232 A1 | 2/2007 | Walsh et al. |
| 2007/0128142 A1 | 6/2007 | Harrison et al. |
| 2007/0135007 A1 | 6/2007 | McCarthy et al. |
| 2007/0264437 A1 | 11/2007 | Zimmermann et al. |
| 2008/0015298 A1 | 1/2008 | Xiong et al. |
| 2008/0102347 A1 | 5/2008 | Blunk |
| 2008/0153963 A1 | 6/2008 | Baran et al. |
| 2008/0221009 A1 | 9/2008 | Kanagasabapathy et al. |
| 2008/0221263 A1 | 9/2008 | Kanagasabapathy et al. |
| 2008/0245273 A1 | 10/2008 | Vyorkka et al. |
| 2008/0250978 A1* | 10/2008 | Baumgart et al. ........ 106/287.19 |
| 2008/0268233 A1 | 10/2008 | Lawin et al. |
| 2009/0107524 A1 | 4/2009 | Gross et al. |
| 2009/0227164 A1 | 9/2009 | Broch-Nielsen et al. |
| 2009/0298369 A1 | 12/2009 | Koene et al. |
| 2010/0068434 A1* | 3/2010 | Steele et al. ................. 428/36.9 |
| 2010/0069864 A1 | 3/2010 | Berland et al. |
| 2010/0092809 A1 | 4/2010 | Drzal et al. |
| 2010/0184346 A1 | 7/2010 | Qi et al. |
| 2010/0189925 A1 | 7/2010 | Li et al. |
| 2010/0266648 A1 | 10/2010 | Ranade et al. |
| 2011/0021698 A1 | 1/2011 | Vyörykkä et al. |
| 2011/0207850 A1 | 8/2011 | Kan et al. |
| 2011/0287203 A1 | 11/2011 | Victor et al. |
| 2011/0311757 A1 | 12/2011 | Iverson et al. |

FOREIGN PATENT DOCUMENTS

| | | |
|---|---|---|
| CN | 101434802 A | 5/2009 |
| CN | 101845242 A | 9/2010 |
| KR | 10-0823895 B1 | 4/2008 |
| KR | 10-2011-0059173 A | 6/2011 |
| KR | 10-2013-0029972 A | 3/2013 |
| WO | WO 99/09070 A1 | 2/1999 |
| WO | WO 2009/118552 A1 | 10/2009 |
| WO | WO 2010/002859 A2 | 1/2010 |
| WO | WO 2010/073623 A1 | 7/2010 |
| WO | WO 2011/020701 A1 | 2/2011 |

OTHER PUBLICATIONS

Co-pending U.S. Appl. No. 13/193,145, filed Jul. 28, 2011, by Megaridis et al. for "Superhydrophobic Compositions."

American Society for Testing Materials (ASTM) Designation: F 903-10, "Standard Test Method for Resistance of Materials Used in Protective Clothing to Penetration by Liquids," pp. 1-10, published Feb. 2010.

Schutzius, T.M. et al., "Water-Based, Nonfluorinated Dispersions for Environmentally Benign, Large-Area, Superhydrophobic Coatings," ACS Applied Materials & Interfaces, vol. 5, No. 24, Dec. 2, 2013, pp. 13419-13425.

Shunjin, Peng, "Preparation of Aqueous Fluoropolymer Latexes and Their Application as Finishing Agents with Water-and-Oil Repellency," Chinainfo, Aug. 7, 2007, pp. 42, 44, 47 and 48.

* cited by examiner

SUPERHYDROPHOBIC SURFACES

FIELD OF THE INVENTION

The present invention relates to surfaces that exhibit superhydrophobic properties when treated with a composition comprising a water-based, non-organic solvent.

BACKGROUND OF THE INVENTION

A superhydrophobic surface exhibits a sessile water contact angle of greater than 150°. If, additionally, the surface exhibits a water droplet roll-off (sliding) angle of less than 10°, the surface is deemed to be "self-cleaning". In nature, lotus leaves exhibit such properties (so-called lotus effect). Most of man-made materials, such as fabrics, nonwovens, cellulose tissues, polymer films, etc., do not have surfaces with such properties. Currently, there are generally two methods to modify a non-superhydrophobic surface to achieve the lotus effect. One method is to graft a hydrophobic monomer onto every surface of a non-superhydrophobic material. Such a method makes the material superhydrophobic throughout the thickness of the material, which may not be desired in most cases. It is also not cost effective, cannot be used for a continuous production, and may lead to undesirable environment issues. Another approach is to coat a specially formulated liquid dispersion onto a surface, and upon subsequent drying, a nano-structured superhydrophobic film forms. In order to utilize such an approach, the deposited film must exhibit a chemical and physical morphology characteristic of superhydrophobic surfaces. First, the formulation requires at least one low-surface energy (i.e., hydrophobic) component, such as a perfluorinated polymer (e.g., polytetrafluoroethylene), and second, the treated surface has to have a rough surface texture, preferably at several length-scales—micro and nano-roughness. Although various formulated dispersions capable of achieving a superhydrophobic surface exist, none of these dispersions appear to be purely water-based. For a multitude of safety, health, economic, and environmental issues, it is also important that the dispersion be fully aqueous-based when regarding commercial scale production, as this will decrease concerns associated with the use of organic solvents.

SUMMARY OF THE INVENTION

The present invention relates to a superhydrophobic surface comprising a substrate treated with a composition comprising: (a) a hydrophobic component, (b) nano-structured particles, and (c) water.

DETAILED DESCRIPTION OF THE INVENTION

Figure 1:
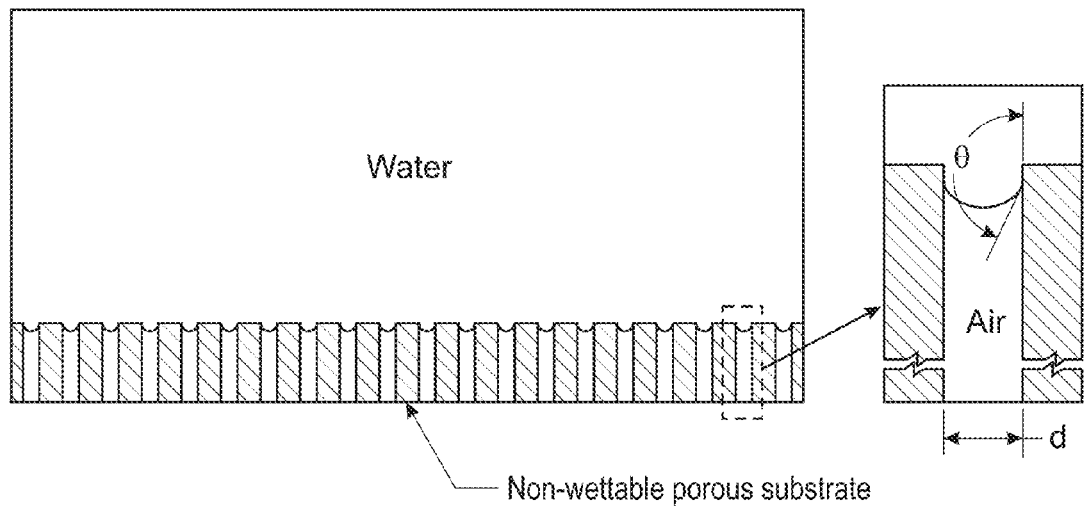
FIG. 1 shows a non-wettable porous substrate resisting penetration of water due to its small pore size d and high hydrophobicity (high contact angle, $\theta$).

All percentages are by weight of the total composition unless specifically stated otherwise. All ratios are weight ratios unless specifically stated otherwise.

The term "superhydrophobic" refers to the property of a surface to repel water very effectively. This property is quantified by a water contact angle exceeding 150.

The term "hydrophobic", as used herein, refers to the property of a surface to repel water with a water contact angle from about 90° to about 120. The term "hydrophilic", as used herein, refers to surfaces with water contact angles well below 90°.

The term "self-cleaning," as used herein, refers to the property to repel water with the water roll-off angle on a tilting surface being below 10°.

As used herein, the term "nonwoven web" or "nonwoven fabric" means a web having a structure of individual fibers or threads which are interlaid, but not in an identifiable manner as in a knitted web. Nonwoven webs have been formed from many processes, such as, for example, meltblowing processes, spunbonding processes, air-laying processes, coforming processes and bonded carded web processes. The basis weight of nonwoven webs is usually expressed in ounces of material per square yard (osy) or grams per square meter (gsm) and the fiber diameters are usually expressed in microns, or in the case of staple fibers, denier. It is noted that to convert from osy to gsm, multiply osy by 33.91.

As used herein the term "spunbond fibers" refers to small diameter fibers of molecularly oriented polymeric material.

Spunbond fibers may be formed by extruding molten thermoplastic material as fibers from a plurality of fine, usually circular capillaries of a spinneret with the diameter of the extruded fibers then being rapidly reduced as in, for example, U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 microns or greater in diameter. However, fine fiber spunbond webs (having an average fiber diameter less than about 10 microns) may be achieved by various methods including, but not limited to, those described in commonly assigned U.S. Pat. No. 6,200,669 to Marmon et al. and U.S. Pat. No. 5,759,926 to Pike et al.

Meltblown nonwoven webs are prepared from meltblown fibers. As used herein the term "meltblown fibers" means fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin. Meltblown fibers are microfibers which may be continuous or discontinuous, are generally smaller than 10 microns in average diameter (using a sample size of at least 10), and are generally tacky when deposited onto a collecting surface.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

As used herein, the term "multicomponent fibers" refers to fibers or filaments which have been formed from at least two polymers extruded from separate extruders but spun together to form one fiber. Multicomponent fibers are also sometimes referred to as "conjugate" or "bicomponent" fibers or filaments. The term "bicomponent" means that there are two polymeric components making up the fibers. The polymers are usually different from each other, although conjugate fibers may be prepared from the same polymer, if the polymer in each component is different from one another in some physical property, such as, for example, melting point, glass transition temperature or the softening point. In all cases, the polymers are arranged in substantially constantly positioned distinct zones across the cross-section of the multicomponent fibers or filaments and extend continuously along the length of the multicomponent fibers or filaments. The configuration of such a multicomponent fiber may be, for example, a sheath/core arrangement, wherein one polymer is surrounded by another, a side-by-side arrangement, a pie arrangement or an "islands-in-the-sea" arrangement. Multicomponent fibers are taught in U.S. Pat. No. 5,108,820 to Kaneko et al.; U.S. Pat. No. 5,336,552 to Strack et al.; and U.S. Pat. No. 5,382,400 to Pike et al. For two component fibers or filaments, the polymers may be present in ratios of 75/25, 50/50, 25/75 or any other desired ratios.

As used herein, the term "multiconstituent fibers" refers to fibers which have been formed from at least two polymers extruded from the same extruder as a blend or mixture. Multiconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Fibers of this general type are discussed in, for example, U.S. Pat. Nos. 5,108,827 and 5,294,482 to Gessner.

As used herein, the term "substantially continuous fibers" is intended to mean fiber that have a length which is greater that the length of staple fibers. The term is intended to include fibers which are continuous, such as spunbond fibers, and fibers which are not continuous, but have a defined length greater than about 150 millimeters.

As used herein, the term "staple fibers" means fibers that have a fiber length generally in the range of about 0.5 to about 150 millimeters. Staple fibers may be cellulosic fibers or non-cellulosic fibers. Some examples of suitable non-cellulosic fibers that can be used include, but are not limited to, polyolefin fibers, polyester fibers, nylon fibers, polyvinyl acetate fibers, and mixtures thereof. Cellulosic staple fibers include for example, pulp, thermomechanical pulp, synthetic cellulosic fibers, modified cellulosic fibers, and the like. Cellulosic fibers may be obtained from secondary or recycled sources. Some examples of suitable cellulosic fiber sources include virgin wood fibers, such as thermomechanical, bleached and unbleached softwood and hardwood pulps. Secondary or recycled cellulosic fibers may be obtained from office waste, newsprint, brown paper stock, paperboard scrap, etc., may also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon may be used. Modified cellulosic fibers are generally are composed of derivatives of cellulose formed by substitution of appropriate radicals (e.g., carboxyl, alkyl, acetate, nitrate, etc.) for hydroxyl groups along the carbon chain.

As used herein, the term "pulp" refers to fibers from natural sources such as woody and non-woody plants. Woody plants include, for example, deciduous and coniferous trees. Non-woody plants include, for example, cotton, flax, esparto grass, milkweed, straw, jute, hemp, and bagasse.

As used herein, "tissue products" are meant to include facial tissue, bath tissue, towels, hanks, napkins and the like. The present invention is useful with tissue products and tissue paper in general, including but not limited to conventionally felt-pressed tissue paper, high bulk pattern densified tissue paper, and high bulk, uncompacted tissue paper.

The present invention relates to a surface of a substrate, or the substrate itself, exhibiting superhydrophobic characteristics when treated with a formulation comprising a hydrophobic component, nano-structured particles and water. The superhydrophobicity can be applied either over the entire surface, patterned throughout or on the substrate material, and/or directly penetrated through the z-directional thickness of the substrate material.

Hydrophobic Component

The hydrophobic component is a hydrophobic polymer that is dispersible in water to form the basic elements of the superhydrophobic properties of the present invention. In general, a hydrophobic component of this invention may include, but is not limited to, fluorinated or perfluorinated polymers. However, due to low degree of water dispersibility, the fluorinated or perfluorinated polymer may need to be modified by introducing a comonomer onto their molecular structure. Suitable comonomers include, but are not limited to, ethylenically unsaturated monomers comprising functional groups which are capable of being ionized in water. One example is ethylenically unsaturated carboxylic acid, such as acrylic acid. The amount of the comonomer within the hydrophobic component is determined by balancing two properties: hydrophobicity and water dispersibility. One example of the hydrophobic component of this invention is a commercially available modified perfluorinated polymer compound available from DuPont as a water-based product under the trade name Capstone® ST-100. Due to its low surface energy, the polymer not only contributes to the superhydrophobicity, but it may also act as a binder to adhere the nano-structured particles of the present invention onto the surface. Additionally, the polymer molecules can be modified to contain groups, such as amines, that can become charged upon pH reduction and alter the dynamics of hydrophobicity within the liquid dispersion. In such a case, the polymer may stabilize in water through partial interaction. Surfactants that are introduced into the composition may also behave as dispersants of the polymer, thereby also altering some of the hydrophobic mechanics.

The solid components of the present invention (i.e., polymer, nano-structured particles) may be present in an amount from about 1.0% to about 3.0%, by weight of the solution. Such an amount is suitable for spray applications where higher concentrations of either polymer and/or nano-structured particles in the dispersion can lead to either viscoelastic behavior, resulting in either clogging of the spray nozzle or incomplete atomization and fiber formation, or dramatic increases in dispersion viscosity and thus nozzle clogging. It should be noted that this range is not fixed and that it is a function of the materials being utilized and the procedure used to prepare the dispersion. When a higher amount of the polymer is used, the surface structure is less desirable as it lacks the proper texture to be superhydrophobic. When a lower amount of the polymer is used, the binding is less desirable as the coating behaves more so as a removable powder coating. Additionally, it is desired that the polymer-to-particle weight ratio be about 4:1 or about 3:2, or about 1:1, or about 2:3, or about 1:4 in order to optimize the balance between low surface energy and desirable surface texture.

Non-Organic Solvent

The formulation used in treating the surface of the present invention eliminates the use of an organic solvent by carefully selecting the appropriate combination of elements to impart the superhydrophobic characteristics. Preferably, the non-organic solvent is water. Any type of water may be used; however, demineralized or distilled water may be opted for use during the manufacturing process for enhanced capabilities. The use of water helps to reduce the safety concerns associated with making commercial scale formulations comprising organic solvents. For example, due to the high volatility and flammability of most organic solvents, eliminating such use in the composition reduces production safety hazards. Additionally, production costs may be lowered with the elimination of ventilation and fire prevention equipment necessitated by organic solvents. Raw material costs may be reduced in addition to the transportation of such materials as an added advantage to utilizing the non-organic solvent formulation to arrive at the present invention.

Additionally, since water is considered a natural resource, surfaces treated with solvents comprising water as its base may be considered healthier and better for the environment. The formulation used to treat the surface of the present invention comprises greater than about 95%, greater than about 98%, or about 99% water, by weight of the dispersion composition.

Nano-Structured Particles

Nano-structured particles, which we define here as particles exhibiting repeating feature sizes <100 nm, are used in the present invention to achieve a desirable rough surface. The particles may be from the class of fumed silicas, hydrophobic titanium and zinc oxides, and unmodified as well as organically modified nanoclays. Although hydrophobic particles may be used, it is desirable that the particles of the present invention be hydrophilic. If hydrophobic particles are used, the particles must be treated by a surfactant prior to being dispersed in water in order to prevent agglomeration. When used, the amount of surfactant present must be kept at a low concentration in order that the desired superhydrophobic properties are maintained. Therefore, the use of surfactants within the present invention should be from about 0%, or from about 0.25%, or from about 1.0% to no more than about 0.5%, or no more than about 1.5% or no more than about 2%, by weight of the total composition. Such surfactants can be nonionic, cationic, or anionic in nature. Suitable anionic surfactants may include, but are not limited to sulfonates, carboxylates, and phosphates. Suitable cationic surfactants may include, but are not limited to, quaternary amines. Suitable nonionic surfactants may include, but are not limited to, block copolymers containing ethylene oxide and silicone surfactants.

Other Ingredients

Binders

The hydrophobic polymers within the formulation of the present invention play a dual role in acting both as a hydrophobic component and a binder. Polymers such as Dupont's Capstone® ST-100 promote adhesion, as compared to the fluorinated polymer alone, so that an additional binder within the composition is not necessary. If a water-dispersible hydrophobic polymer is used wherein an additional binder is needed, it is preferred that the binder is selected from water-dispersible acrylics, polyurethane dispersions, acrylic copolymers, or acrylic polymer precursors (which can cross link after the coating is cured).

The amount of the binder present within the formulation of the present invention may vary. A binder may be included in an effective amount of up to about 2.0% by weight of the total dispersion composition.

Stabilizing Agent

The formulation within the present invention may be additionally treated with a stabilizing agent to promote the formation of a stable dispersion when other ingredients are added to it. The stabilizing agent may be a surfactant, a polymer, or mixtures thereof. If a polymer acts as a stabilizing agent, it is preferred that the polymer differ from the hydrophobic component used within the base composition previously described.

Additional stabilizing agents may include, but are not limited to, cationic surfactants such as quaternary amines; anionic surfactants such as sulfonates, carboxylates, and phosphates; or nonionic surfactants such as block copolymers containing ethylene oxide and silicone surfactants. The surfactants may be either external or internal. External surfactants do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts.

In some embodiments, the stabilizing agent used within the composition to treat the surface of the present invention may be used in an amount ranging from greater than zero to about 60%, by of the hydrophobic component. For example, long chain fatty acids or salts thereof may be used from about 0.5% to about 10% by weight based on the amount of hydrophobic component. In other embodiments, ethylene-acrylic acid or ethylene-methacrylic acid copolymers may be used in an amount up to about 80%, by weight based of hydrophobic component. In yet other embodiments, sulfonic acid salts may be used in an amount from about 0.01% to about 60% by weight based on the weight of the hydrophobic component. Other mild acids, such as those in the carboxylic acid family (e.g., formic acid), may also be included in order to further stabilize the dispersion. In an embodiment that includes formic acid, the formic acid may be present in amount that is determined by the desired pH of the dispersion wherein the pH is less than about 6.

Additional Fillers

The composition used to treat the surface of the present invention may further comprise one or more fillers. The composition may comprise from about 0.01 to about 600 parts, by weight of the hydrophobic component, for example, polyolefin and the stabilizing agent. In certain embodiments, the filler loading in the composition can be from about 0.01 to about 200 parts by the weight of the hydrophobic component, for example, polyolefin, and the stabilizing agent. It is preferred that such filler material, if used, be hydrophilic. The filler material can include conventional fillers such as milled glass, calcium carbonate, aluminum trihydrate, talc, antimony trioxide, fly ash, clays (such as bentonite or kaolin clays for example), or other known fillers. Untreated clays and talc are usually hydrophilic by nature.

Substrate

The substrate of the present invention may be treated such that it is superhydrophobic throughout the z-directional thickness of the material and is controlled in such a way that only certain areas of the material are superhydrophobic. Such treatment may be designed to control which areas of the material may or may not be penetrated by wetness, thereby controlling where liquid may flow.

Suitable substrates of the present invention can include a nonwoven fabric, woven fabric, knit fabric, or laminates of these materials. The substrate may also be a tissue or towel, as described herein. Materials and processes suitable for forming such substrate are generally well known to those skilled in the art. For instance, some examples of nonwoven fabrics that may be used in the present invention include, but are not limited to, spunbonded webs, meltblown webs, bonded carded webs, air-laid webs, coform webs, spunlace nonwoven web, hydraulically entangled webs, and the like. In each case, at least one of the fibers used to prepare the nonwoven fabric is a thermoplastic material containing fiber. In addition, nonwoven fabrics may be a combination of thermoplastic fibers and natural fibers, such as, for example, cellulosic fibers (softwood pulp, hardwood pulp, thermomechanical pulp, etc.). Generally, from the standpoint of cost and desired properties, the substrate of the present invention is a nonwoven fabric.

If desired, the nonwoven fabric may also be bonded using techniques well known in the art to improve the durability, strength, hand, aesthetics, texture, and/or other properties of the fabric. For instance, the nonwoven fabric can be thermally (e.g., pattern bonded, through-air dried), ultrasonically, adhesively and/or mechanically (e.g. needled) bonded. For instance, various pattern bonding techniques are described in U.S. Pat. No. 3,855,046 to Hansen; U.S. Pat. No. 5,620,779 to Levy, et al.; U.S. Pat. No. 5,962,112 to Haynes, et al.; U.S. Pat. No. 6,093,665 to Sayovitz, et al.; U.S. Design Pat. No. 428,267 to Romano, et al.; and U.S. Design Pat. No. 390,708 to Brown.

The nonwoven fabric can be bonded by continuous seams or patterns. As additional examples, the nonwoven fabric can be bonded along the periphery of the sheet or simply across the width or cross-direction (CD) of the web adjacent the edges. Other bond techniques, such as a combination of thermal bonding and latex impregnation, may also be used. Alternatively and/or additionally, a resin, latex or adhesive may be applied to the nonwoven fabric by, for example, spraying or printing, and dried to provide the desired bonding. Still other suitable bonding techniques may be described in U.S. Pat. No. 5,284,703 to Everhart, et al., U.S. Pat. No. 6,103,061 to Anderson, et al., and U.S. Pat. No. 6,197,404 to Varona.

In another embodiment, the substrate of the present invention is formed from a spunbonded web containing monocomponent and/or multicomponent fibers. Multicomponent fibers are fibers that have been formed from at least two polymer components. Such fibers are usually extruded from separate extruders but spun together to form one fiber. The polymers of the respective components are usually different from each other although multicomponent fibers may include separate components of similar or identical polymeric materials. The individual components are typically arranged in substantially constantly positioned distinct zones across the cross-section of the fiber and extend substantially along the entire length of the fiber. The configuration of such fibers may be, for example, a side-by-side arrangement, a pie arrangement, or any other arrangement.

When utilized, multicomponent fibers can also be splittable. In fabricating multicomponent fibers that are splittable, the individual segments that collectively form the unitary multicomponent fiber are contiguous along the longitudinal direction of the multicomponent fiber in a manner such that one or more segments form part of the outer surface of the unitary multicomponent fiber. In other words, one or more segments are exposed along the outer perimeter of the multicomponent fiber. For example, splittable multicomponent fibers and methods for making such fibers are described in U.S. Pat. No. 5,935,883 to Pike and U.S. Pat. No. 6,200,669 to Marmon, et al.

The substrate of the present invention can also contain a coform material. The term "coform material" generally refers to composite materials comprising a mixture or stabilized matrix of thermoplastic fibers and a second non-thermoplastic material. As an example, coform materials may be made by a process in which at least one meltblown die head is arranged near a chute through which other materials are added to the web while it is forming.

Such other materials may include, but are not limited to, fibrous organic materials such as woody or non-woody pulp such as cotton, rayon, recycled paper, pulp fluff and also superabsorbent particles, inorganic absorbent materials, treated polymeric staple fibers and the like. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.

Additionally, the substrate can also be formed from a material that is imparted with texture one or more surfaces. For instances, in some embodiments, the substrate can be formed from a dual-textured spunbond or meltblown material, such as described in U.S. Pat. No. 4,659,609 to Lamers, et al. and U.S. Pat. No. 4,833,003 to Win, et al.

In one particular embodiment of the present invention, the substrate is formed from a hydroentangled nonwoven fabric. Hydroentangling processes and hydroentangled composite webs containing various combinations of different fibers are known in the art. A typical hydroentangling process utilizes high pressure jet streams of water to entangle fibers and/or filaments to form a highly entangled consolidated fibrous structure, e.g., a nonwoven fabric. Hydroentangled nonwoven fabrics of staple length fibers and continuous filaments are disclosed, for example, in U.S. Pat. No. 3,494,821 to Evans and U.S. Pat. No. 4,144,370. Hydroentangled composite nonwoven fabrics of a continuous filament nonwoven web and a pulp layer are disclosed, for example, in U.S. Pat. No. 5,284,703 to Everhart, et al. and U.S. Pat. No. 6,315,864 to Anderson, et al.

Of these nonwoven fabrics, hydroentangled nonwoven webs with staple fibers entangled with thermoplastic fibers is especially suited as the substrate. In one particular example of a hydroentangled nonwoven web, the staple fibers are hydraulically entangled with substantially continuous thermoplastic fibers. The staple may be cellulosic staple fiber, non-cellulosic stable fibers or a mixture thereof. Suitable non-cellulosic staple fibers includes thermoplastic staple fibers, such as polyolefin staple fibers, polyester staple fibers, nylon staple fibers, polyvinyl acetate staple fibers, and the like or mixtures thereof. Suitable cellulosic staple fibers include for example, pulp, thermomechanical pulp, synthetic cellulosic fibers, modified cellulosic fibers, and the like. Cellulosic fibers may be obtained from secondary or recycled sources. Some examples of suitable cellulosic fiber sources include virgin wood fibers, such as thermomechanical, bleached and unbleached softwood and hardwood pulps. Secondary or recycled cellulosic fibers may be obtained from office waste, newsprint, brown paper stock, paperboard scrap, etc., may also be used. Further, vegetable fibers, such as abaca, flax, milkweed, cotton, modified cotton, cotton linters, can also be used as the cellulosic fibers. In addition, synthetic cellulosic fibers such as, for example, rayon and viscose rayon may be used. Modified cellulosic fibers are generally are composed of derivatives of cellulose formed by substitution of appropriate radicals (e.g., carboxyl, alkyl, acetate, nitrate, etc.) for hydroxyl groups along the carbon chain.

One particularly suitable hydroentangled nonwoven web is a nonwoven web composite of polypropylene spunbond fibers, which are substantially continuous fibers, having pulp fibers hydraulically entangled with the spunbond fibers. Another particularly suitable hydroentangled nonwoven web is a nonwoven web composite of polypropylene spunbond fibers having a mixture of cellulosic and non-cellulosic staple fibers hydraulically entangled with the spunbond fibers.

The substrate of the present invention may be prepared solely from thermoplastic fibers or may contain both thermoplastic fibers and non-thermoplastic fibers. Generally, when the substrate contains both thermoplastic fibers and non-thermoplastic fibers, the thermoplastic fibers make up from about 10% to about 90%, by weight of the substrate. In a particular embodiment, the substrate contains between about 10% and about 30%, by weight, thermoplastic fibers.

Generally, a nonwoven substrate will have a basis weight in the range of about 17 gsm (grams per square meter) to about 200 gsm, more typically, between about 33 gsm to about 200 gsm. The actual basis weight can be higher than 200 gsm, but for many applications, the basis weight will be in the 33 gsm to 150 gsm range.

The thermoplastic materials or fibers making-up at least a portion of the substrate can essentially be any thermoplastic polymer. Suitable thermoplastic polymers include polyolefins, polyesters, polyamides, polyurethanes, polyvinylchloride, polytetrafluoroethylene, polystyrene, polyethylene terephthalate, biodegradable polymers such as polylactic acid and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly(1-butene) and poly(2-butene); polypentene, e.g., poly(1-pentene) and poly(2-pentene); poly(3-methyl-1-pentene); poly(4-methyl 1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polytrimethylene terephthalate, polybutylene terephthalate, polytetramethylene terephthalate, polycyclohexylene-1,4-dimethylene terephthalate, and isophthalate copolymers thereof, as well as blends thereof. These thermoplastic polymers can be used to prepare both substantially continuous fibers and staple fibers, in accordance with the present invention.

In another embodiment, the substrate may be a tissue product. The tissue product can be of a homogenous or multi-layered construction, and tissue products made therefrom can be of a single-ply or multi-ply construction. The tissue product desirably has a basis weight of about 10 g/m2 to about 65 g/m2, and density of about 0.6 g/cc or less. More desirably, the basis weight will be about 40 g/m2 or less and the density will be about 0.3 g/cc or less. Most desirably, the density will be about 0.04 g/cc to about 0.2 g/cc. Unless otherwise specified, all amounts and weights relative to the paper are on a dry basis. Tensile strengths in the machine direction can be in the range of from about 100 to about 5,000 grams per inch of width. Tensile strengths in the cross-machine direction are from about 50 grams to about 2,500 grams per inch of width. Absorbency is typically from about 5 grams of water per gram of fiber to about 9 grams of water per gram of fiber.

Conventionally pressed tissue products and methods for making such products are well known in the art. Tissue products are typically made by depositing a papermaking furnish on a foraminous forming wire, often referred to in the art as a Fourdrinier wire. Once the furnish is deposited on the forming wire, it is referred to as a web. The web is dewatered by pressing the web and drying at elevated temperature. The particular techniques and typical equipment for making webs according to the process just described are well known to those skilled in the art. In a typical process, a low consistency pulp furnish is provided from a pressurized headbox, which has an opening for delivering a thin deposit of pulp furnish onto the Fourdrinier wire to form a wet web. The web is then typically dewatered to a fiber consistency of from about 7% to about 25% (total web weight basis) by vacuum dewatering and further dried by pressing operations wherein the web is subjected to pressure developed by opposing mechanical members, for example, cylindrical rolls. The dewatered web is then further pressed and dried by a steam drum apparatus known in the art as a Yankee dryer. Pressure can be developed at the Yankee dryer by mechanical means such as an opposing cylindrical drum pressing against the web. Multiple Yankee dryer drums can be employed, whereby additional pressing is optionally incurred between the drums. The formed sheets are considered to be compacted since the entire web is subjected to substantial mechanical compressional forces while the fibers are moist and are then dried while in a compressed state.

One particular embodiment of the present invention utilizes an uncreped through-air-drying technique to form the tissue product. Through-air-drying can increase the bulk and softness of the web. Examples of such a technique are disclosed in U.S. Pat. No. 5,048,589 to Cook, et al.; U.S. Pat. No. 5,399,412 to Sudall, et al.; U.S. Pat. No. 5,510,001 to Hermans, et al.; U.S. Pat. No. 5,591,309 to Ruqowski, et al.; U.S. Pat. No. 6,017,417 to Wendt, et al., and U.S. Pat. No. 6,432,270 to Liu, et al. Uncreped through-air-drying generally involves the steps of: (1) forming a furnish of cellulosic fibers, water, and optionally, other additives; (2) depositing the furnish on a traveling foraminous belt, thereby forming a fibrous web on top of the traveling foraminous belt; (3) subjecting the fibrous web to through-air-drying to remove the water from the fibrous web; and (4) removing the dried fibrous web from the traveling foraminous belt.

Manufacture

Conventional scalable methods, such as spraying, can be used to apply a superhydrophobic coating on a surface. In one embodiment, a hydrophilic nano-structured filler (Nanomer® PGV nanoclay from Sigma Aldrich), which is a bentonite clay without organic modification is used. As a hydrophobic component, a 20 wt. % dispersion of a fluorinated acrylic co-polymer (PMC) in water is used, as obtained from DuPont (trade name is Capstone® ST-100). The hydrophilic nanoclay is added to water and is sonicated until a stable suspension is produced. Sonication can be done by utilizing a probe sonicator at room temperature (Sonics®, 750 W, High Intensity Ultrasonic Processor, 13 mm diameter tip at 30 amplitude). At these settings, it may take from about 15 to about 30 min for a stable 15.5 g nanoclay-water suspension to form. The concentration of the nanoclay in water is kept below 2 wt. % of total suspension to prevent the formation of a gel, which renders the dispersion too viscous to spray. After placing the stable clay-water suspension under mechanical mixing at room temperature, the aqueous PMC dispersion is added drop-wise to the suspension to produce the final dispersion for spray. In such embodiment, the concentrations of each component in the final dispersion for producing a superhydrophobic coating will be as follows: 95.5 wt. % water, 2.8% PMC, 1.7% nanoclay or 97.5 wt. % water, 1.25% PMC, 1.25% nanoclay. Coatings may be applied by spray onto cellulosic substrates at a distance of about 15 to about 25 cm using an airbrush atomizer (Paasche VL siphon feed, 0.55 mm spray nozzle) either by hand or by mounting the device onto an industrial fluid dispensing robot (EFD, Ultra TT Series). EFD nozzles with air assist may also be utilized as this achieves extremely fine mists during spray application. The smallest nozzle diameter suggested for the EFD dispensing system is about 0.35 mm. The air fans assist in shaping the spray cone into an oval shape, which is useful for producing a continuous uniform coating on a linearly moving substrate. For the airbrush, operation relies on pressurized air passing through the nozzle in order to siphon-feed the particle dispersion and also to facilitate fluid atomization at the nozzle exit. The pressure drop applied across the sprayer may vary from about 2.1 to about 3.4 bar, depending on conditions.

Some technical difficulties are typically encountered when spraying water-based dispersions: The first major problem is insufficient evaporation of the fluid during atomization and a high degree of wetting of the dispersion onto the coated substrate, both resulting in non-uniform coatings due to contact line pinning and the so called "coffee-stain effect" when the water eventually evaporates. The second major challenge is the relatively large surface tension of water when compared with other solvents used for spray coating. Water, due to its high surface tension, tends to form non-uniform films in spray applications, thus requiring great care to ensure that a uniform coating is attained. This is especially critical for hydrophobic substrates where the water tends to bead and roll. It was observed that the best approach for applying the aqueous dispersions of the present invention was to produce extremely fine droplets during atomization, and to apply only very thin coatings, so as not to saturate the substrate and re-orient hydrogen bonding within the substrate which, after drying, would cause cellulosic substrates (e.g. paper towel) to become stiff.

In another embodiment, the coatings are spray cast first on a substrate, such as standard paperboard or other cellulosic substrate; multiple spray passes are used to achieve different coating thicknesses. The sprayed films are then subjected to drying in an oven at about 80° C. for about 30 min to remove all excess water. The size of the substrate may be approximately, but not limited to about 7.5 cm×9 cm. Once dried, the coatings are characterized for wettability (i.e., hydrophobic vs. hydrophilic). The substrates may be weighed on a microbalance (Sartorius® LE26P) before and after coating and drying in order to determine the minimum level of coating required to induce superhydrophobicity. This "minimum coating" does not strictly mean that the sample will resist penetration by liquids, but rather that a water droplet will bead on the surface and roll off unimpeded. Liquid repellency of substrates before and after coating may be characterized by a hydrostatic pressure setup that determines liquid penetration pressures (in cm of liquid).

Performance Characterization

Contact angle values may be obtained by a backlit optical image setup utilizing a CCD camera. For dynamic contact angle hysteresis measurements (which designate the self-cleaning property), the CCD camera may be replaced by a high-speed camera, such as Redlake™ Motion Pro, in order to accurately capture advancing and receding contact angle values. The lower the difference between advancing and receding contact angles (i.e. contact angle hysteresis), the more self-cleaning the surface is. Liquid penetration pressure may be determined by increasing the hydrostatic column pressure until liquid penetrates the sample in accordance with ASTM F903-10. Liquid penetration may be recorded by an optical image setup utilizing a CCD camera.

Wettability of the composite coatings may be first tested on paperboard, an untextured hydrophilic cellulosic substrate deemed to be representative of the general class of cellulosic substrates (textured or untextured). Nanoclay concentration is incorporated at increasing concentrations in the coating until self-cleaning behavior is observed. The purpose of adding nanoclay to the composite coating is to affect the texture of the coating. It is known that superhydrophobicity and self-cleaning behavior are controlled by two mechanisms, namely, surface roughness and surface energy. It has also been shown that hierarchical structures in conjunction with low-surface energy groups offer an excellent pathway for achieving the roughness necessary for superhydrophobicity. Nanoclay has a platelet structure with nanoscale thickness and microscale length which, when self-assembled (through electrostatic interaction), produces the aforementioned hierarchical structure. The level of nanoclay concentration in the composite coating where self-cleaning is first observed is about 38 wt. % of final composite coating (about 62 wt. % PMC of final coating). When this composite coating is spray cast on paperboard, it can achieve a contact angle of about 146±3° (nearly superhydrophobic), and a contact angle hysteresis of about 21±5°. A lower value of hysteresis may be expected for more hydrophobic nano-structured particles, but aqueous dispersions based on hydrophobic fillers are extremely difficult to realize.

Figure 2:
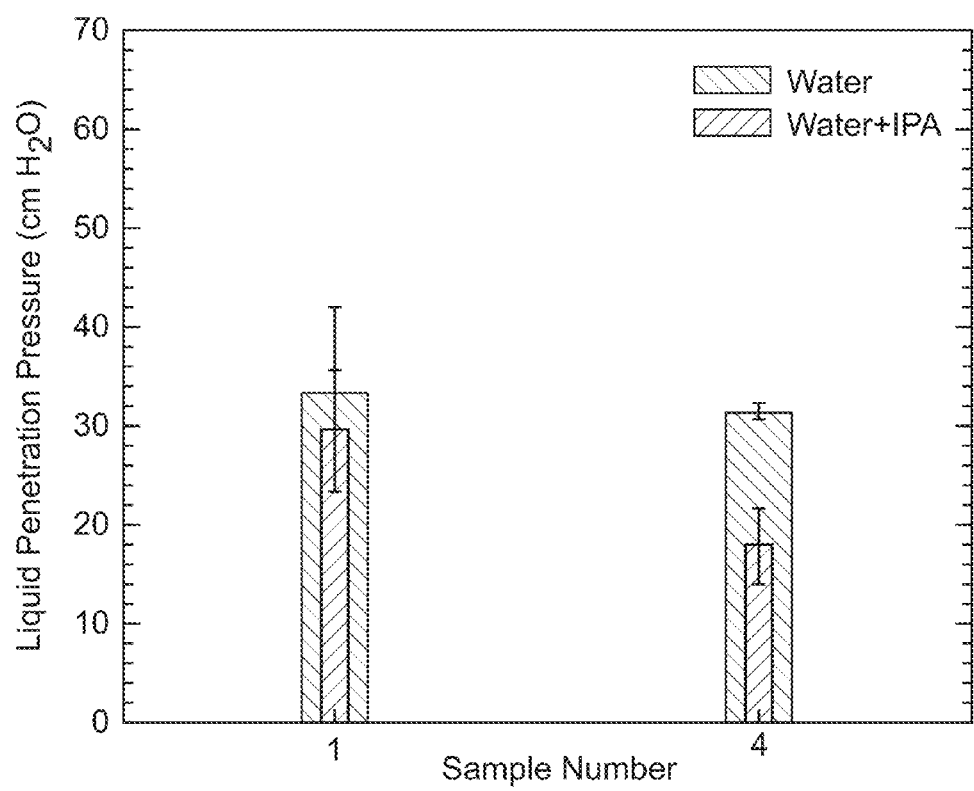
FIG. 2 shows water and water+isopropyl alcohol (IPA) mixture penetration pressures (hydrohead) for a hydrophobic, melt-blown substrate (Sample 1) and a hydrophilic, cellulosic-based substrate (Sample 4), both coated with an aqueous fluorochemical dispersion, PMC (trade name Capstone ST-100, fluorinated acrylic copolymer, 20 wt. % in water, obtained from DuPont). There are no nano-structured particles in this formulation, wherein the coating mass per unit area is >10 g/m$^2$.

While in the case of superhydrophobicity the emphasis is placed on increasing roughness and lowering surface energy, for resisting penetration of liquids into substrates, substrate pore size and surface energy are important factors. FIG. 1 shows an ideally configured porous substrate (straight pores of uniform diameter d distributed evenly) resisting penetration of water. In this configuration, the pressure necessary for penetration of a hydrophobic substrate with pore size d is given by the Young-Laplace equation $\Delta p = 4\gamma \cos \theta/d$, where $\gamma$ is the surface tension of water, and $\theta$ ($\theta > 90°$) is the contact angle between water and the substrate. The more hydrophobic the porous substrate (i.e., the higher the value of $\theta$), the higher the liquid penetration pressure $\Delta p$. It is apparent that penetration pressure scales inversely with the pore size (the finer the pore, the higher the pressure required to cause water penetration). While pore size may be affected by applying relatively thick coating treatments (other hydrophobic formulations) to porous substrates, the effective pore size after coating is generally predetermined by the pore size of the substrate prior to the coating treatment. The general purpose of applying the coating treatment is to decrease the surface energy of the substrate. In the case of a hydrophilic, cellulosic-based substrate, the coating treatment may not produce a uniform, low-surface energy film around some fibers, which, being hydrophilic, may absorb water readily to result in a 0 cm liquid penetration pressure value. Adding coating treatments should confer some appreciable resistance to water penetration. The effectiveness of this approach is measured by the liquid penetration pressure (i.e. "hydrohead", which is measured in cm of the liquid used to challenge a surface). The higher this pressure is, the more effective the coating method is in imparting hydrophobicity to the substrate. Naturally, the liquid penetration pressure depends on the liquid used (value of $\gamma$ in the Young-Laplace equation). Since alcohols have lower surface tension than water, mixtures of water and alcohol result in lower penetration pressures. To show this, FIG. 2 presents liquid penetration pressures of water and water+IPA (9:1 wt.) mixture using only a coating by the fluorochemical dispersion (PMC) and no nano-structured particles. Clearly, the penetration pressure for the water+IPA mixture for both samples is lower than for water alone (as expected due to the lower surface tension of the mixture).

Figure 3A:
FIG. 3(a) shows a 3-dimensional confocal microscope image of a hydrophobic, melt-blown substrate that has been stained with a dye for fluorescence visualization.

Confocal microscopy observations can be performed to determine the porosity of a porous substrate. FIG. 3a shows a 3-dimensional confocal image, while FIG. 3b displays void fraction data for a hydrophobic, melt-blown substrate as a function of substrate depth. The void fraction values can be obtained from the confocal images at different depths of the porous substrate. Confocal microscopy can also be performed on other substrates but it has been determined that highly dense substrates may be too thick and densely packed to accurately determine their void fraction. For a hydrophobic, melt-blown substrate, it can be seen from FIG. 3b that void fraction is at a minimum near the center of the substrate. In brief, FIG. 3 shows how it is possible to affect void fraction (and the resulting pore size) by applying a coating. Clearly, the coated substrate has lower void faction, i.e. smaller pores, which translate into higher required penetration pressures.

EXAMPLES

The following are provided for exemplary purposes to facilitate understanding of the invention and should not be construed to limit the invention to the examples.

Materials: Poly(vinylidene fluoride) (PVDF) pellets ($M_w$~530,000 Da) for solution in NMP, PVDF powder (typical size 231±66 nm), ethyl 2-cyanoacrylate (ECA) monomer, trifluoroacetic acid (TFA), reagent grade ethanol and N-methyl-2-pyrrolidone (NMP) were all obtained from Sigma Aldrich, USA. The particle filler used was a nanoclay, namely Nanomer® 1.31PS, which is a montmorillonite clay surface-modified with 15-35 wt. % octadecylamine and 0.5-5 wt. % aminopropyltriethoxysilane, obtained from Sigma Aldrich, USA. The aqueous fluorochemical dispersion, termed PMC, has the trade name Capstone ST-100 (fluorinated acrylic copolymer, 20 wt. % in water) and was obtained from DuPont.

Spray Application: Coatings were spray cast onto the substrates with a single spray application at a fixed distance of 19 cm using an airbrush atomizer (Paasche VL siphon feed, 0.55 mm spray nozzle) mounted on an automated industrial dispensing robot (EFD, Ultra TT Series). The coated substrates were dried for 30 minutes at 80° C. in an oven, thus producing coatings that were subjected to subsequent structural and wettability characterization.

Baseline Organic-Based Composite Coating Composition (Formulation I): The dried composite coatings on the samples contain only PVDF, PMC and nanoclay.

Water-Organic Based Composite Coating Composition (Formulation II): The dried composite coatings on the samples contain only PVDF and PMC.

Pure Water-Based Composite Coating Compositions (Formulations III, IV and V): The dried composite coatings on the samples contain only the fluorinated acrylic copolymer PMC (Form. III) and nanoclay (Form. IV and V).

Table 1 below lists the superhydrophobic formulations prepared using the materials described above.

TABLE 1

Superhydrophobic Composition of Five Formulations with Gradually Decreasing Organic Solvent Content

| Formulation | Polymer | Solvent | Nano Particles | Additives |
|---|---|---|---|---|
| I | 1.4% PVDF 1.4% PMC | 75.3-74.7% Ethanol 12.5% NMP 5.5% Water | 1.1-1.7% Nanoclay | 2.8% Carboxylic acid (TFA) |
| II | 5% PMC | 45% Ethanol 45% Water | 5% PVDF powder | Carboxylic acid (TFA) traces |
| III | 5% PMC | 95% Water | N/A | N/A |
| IV | 2.8% PMC | 95.5% Water | 1.7% Nanoclay | N/A |
| V | PMC[a] | 97.5% Water | Nanoclay[a] | N/A |

[a]The wt. ratio of Nanoclay: (PMC + Nanoclay) was 0.2, 0.4, 0.5, 0.6 and 0.8.

Figure 4A:
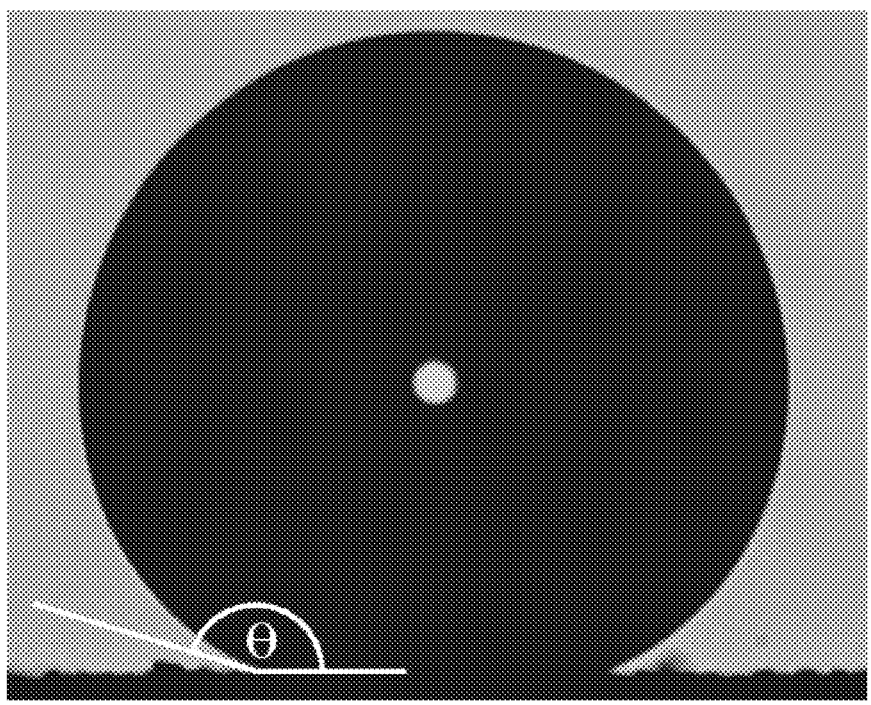
FIG. 4(a) shows sessile contact angle measurement technique. The coating texture is visible.
Figure 4B:
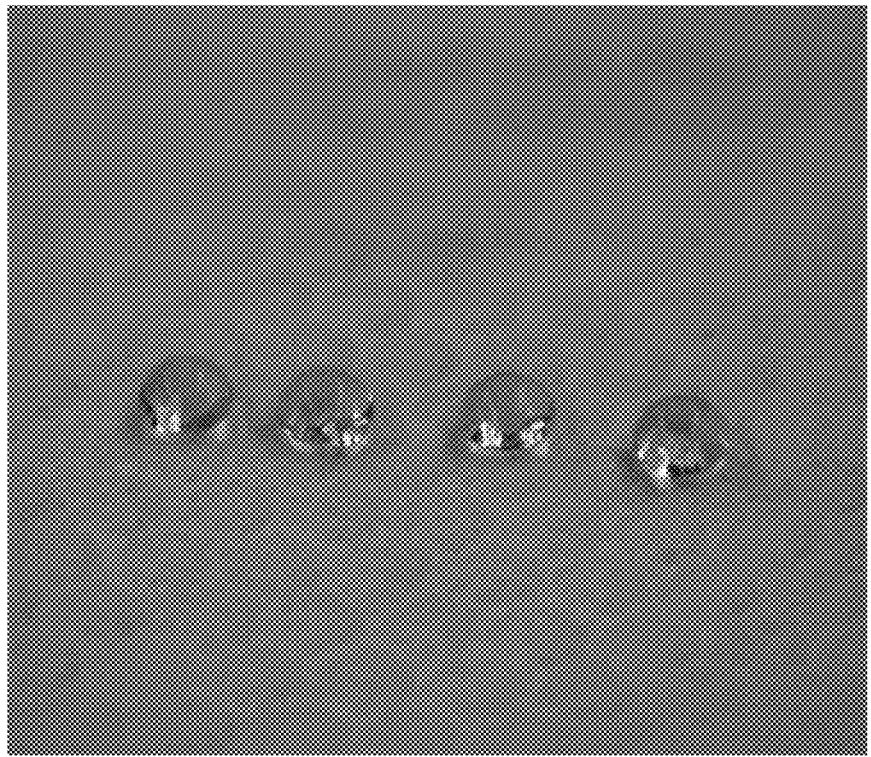
FIG. 4(b) shows water droplet pearls at rest on a coated KC Hydroknit® substrate.

Formulations I-IV were sprayed onto paperboard substrates (standard paperboard that shipping boxes are made from) and water contact angles of the coated substrates were measured (see FIG. 4). Contact angle (CA) measurements were made on paperboard substrates, which do not have inherent texture, thus allowing accurate CA measurements.

Table 2 below lists contact angle testing results for the Formulations I-IV applied on paperboard substrates (required for accurate CA measurements). Both water and water-alcohol (10% isopropanol) were used in the contact angle test.

TABLE 2

Contact Angle Data for Coating Formulations
I-IV with two Separate Probe Liquids

| Formulation | Water Contact Angle (deg) | Water-IPA Contact Angle (deg) |
|---|---|---|
| I | 165 ± 4 | 154 ± 4 |
| II | 158 ± 4 | 153 ± 4 |
| III | 126 ± 3 | 104 ± 3 |
| IV | 146 ± 3 | 135 ± 3 |

Table 3 below lists contact angle testing results for the five cases of Formulation V applied on standard wood-free photocopy paper (brand High White) substrates. This paper was purchased from a wholesaler. It is made in Brazil with a size of 8.5 inches by 11 inches, around 78 grams per square meter basis weight. The data indicates that a superhydrophobic coating (i.e. CA>150 deg) is attained at a nanoclay/solids wt. ratio of 0.4. When this ratio exceeds 0.5, a dramatic reduction in CA is observed.

TABLE 3

Water Contact Angle Data for Formulation
V Applied on Standard Photocopy Paper

| | Nanoclay:(PMC + Nanoclay) wt. Ratio | | | | |
|---|---|---|---|---|---|
| | 0.2 | 0.4 | 0.5 | 0.6 | 0.8 |
| Water CA data (deg) | 146.8 ± 5.1 | 152 ± 3.9 | 148 ± 5 | 110 ± 3 | 108.5 ± 8.1 |

Table 4 below lists five Kimberly-Clark® substrate materials used in spraying experiments.

TABLE 4

Kimberly-Clark ® Substrate Materials

| Sample | Substrate Name | Description |
|---|---|---|
| 1 | SMS | 25 gsm SMS (spunbond/meltblown/spunbond) |
| 2 | Spunbond | 14 gsm spunbond |
| 3 | Scott Towel | Commercial Scott ® Paper Towel |
| 4 | Kimberly-Clark ® Towel | 38 gsm Kleenex ® hard roll towel 50606 |
| 5 | Kimberly-Clark ® Viva ® Towel | 40 gsm Viva ® Paper Towel |

Confocal microscopy was used to measure porosity and to characterize the uncoated and coated samples of all substrate materials before coating. Only Formulation I was applied on all substrates for subsequent characterization by confocal microscopy.

Testing Method Descriptions:
1. Confocal Microscopy: In order to facilitate imaging by the confocal microscope (Zeiss LSM 510), all samples were coated with a fluorescent dye (Rhodamine 610). Coating was done by dissolving the dye in water, dipping the sample into the dye solution, and allowing the sample to dry under ambient conditions. By utilizing the "coffee-stain" effect, one can obtain a uniform deposition of dye onto the substrate to be imaged. Substrate porosity (or void fraction) was measured by importing confocal image stacks into Matlab and analyzing by a standard image analysis and material volume reconstruction technique. Images first underwent thresholding and were then subsequently characterized for void fraction by counting areas of void pixels (i.e., porosity) as a function of depth into the substrate.
2. Liquid Penetration Pressure: Liquid penetration measurements were made according to ASTM-F903-10.

Figure 3B:
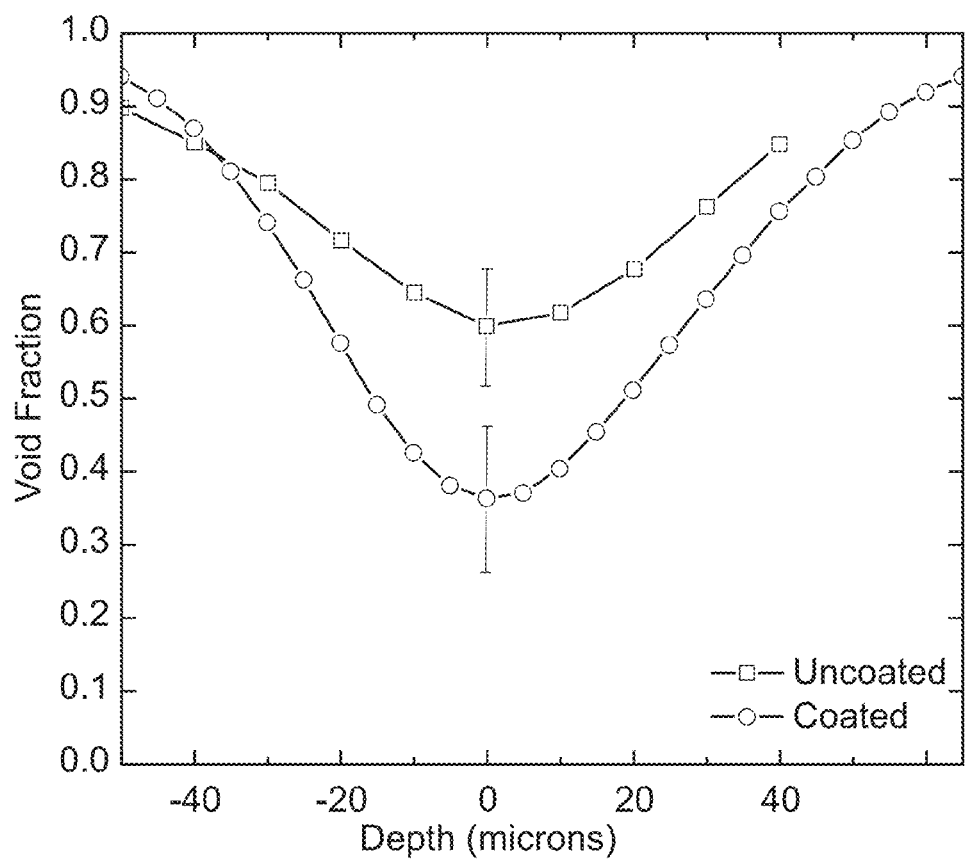
FIG. 3(b) shows the void fraction of a hydrophobic, melt-blown substrate as a function of substrate depth for the pristine substrate (uncoated, open squares) and for the same substrate with a hydrophobic coating (open circles).
Figure 3C:
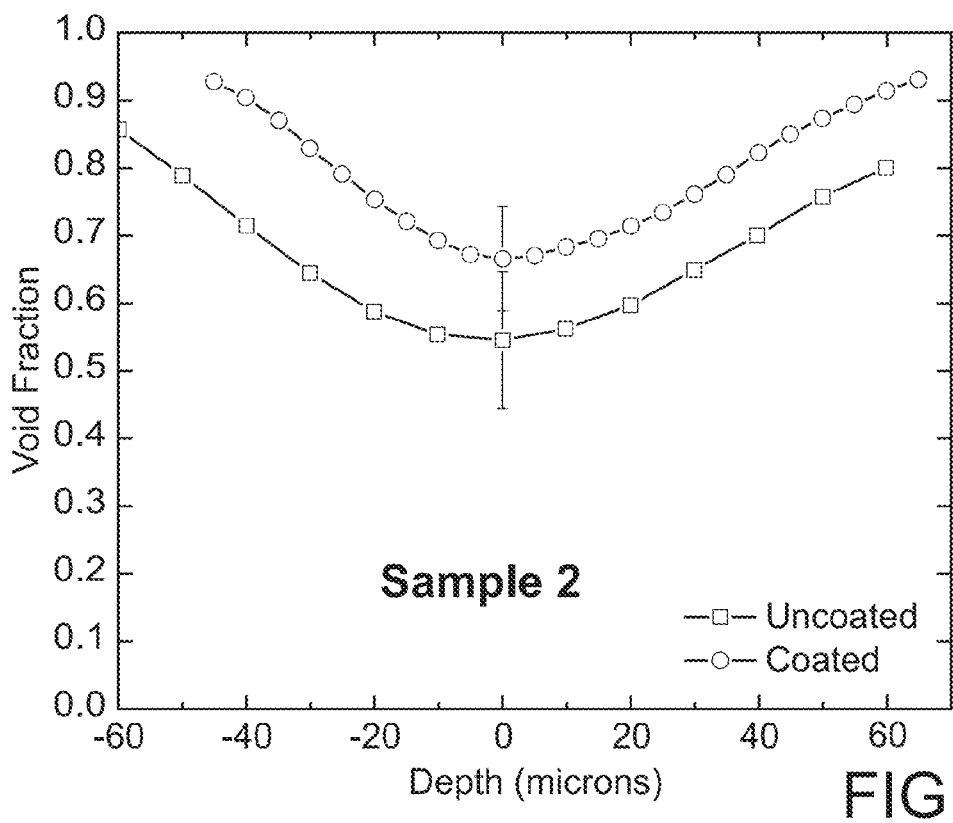
FIG. 3(c) shows the void fraction of a spunbond substrate as a function of substrate depth for the pristine substrate (uncoated, open squares) and for the same substrate with a hydrophobic coating (open circles).
Figure 3D:
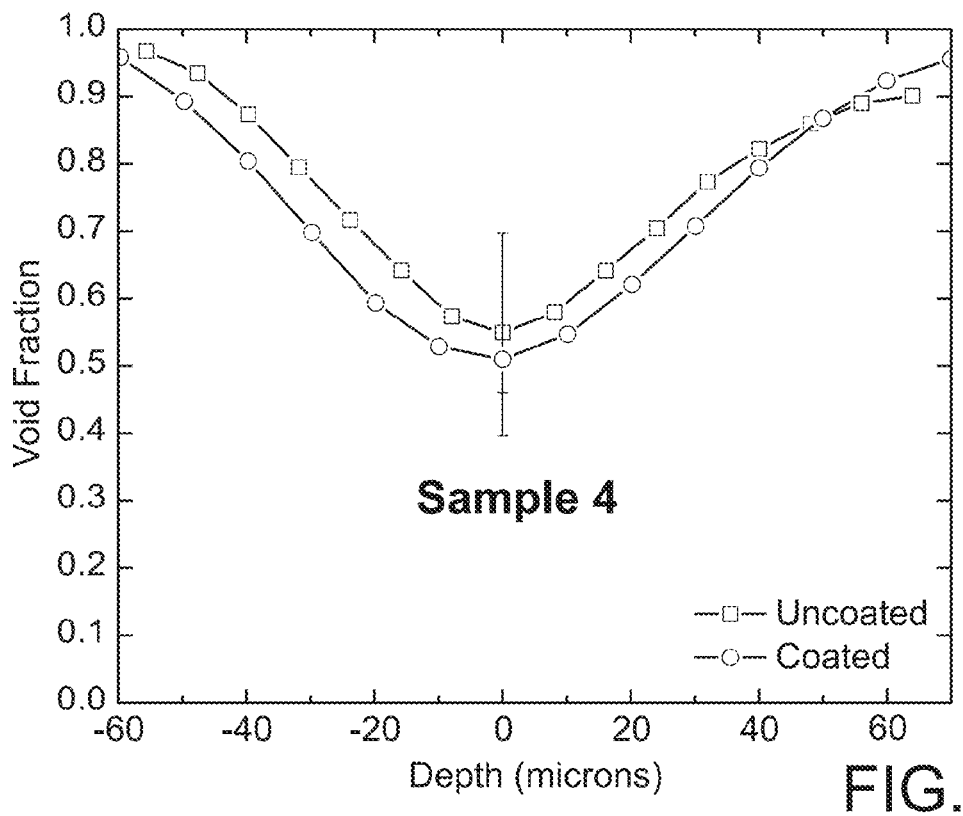
FIG. 3(d) shows the void fraction of a Kimberly-Clark® Towel as a function of substrate depth for the pristine substrate (uncoated, open squares) and for the same substrate with a hydrophobic coating (open circles).

Results:

FIGS. 3b-d show substrate void fraction and z-directional depth of coated SMS, spunbond, and Kimberly-Clark® Towel before and after application of Formulation I at a rate of 27.4 g/m². (FIG. 3b show SMS substrate void fraction before and after application of Formulation I. FIG. 3c shows spunbond substrate void fraction before and after application of Formulation I. FIG. 3d shows Kimberly-Clark® Towel substrate void fraction before and after application of Formulation I).

Figure 5A:
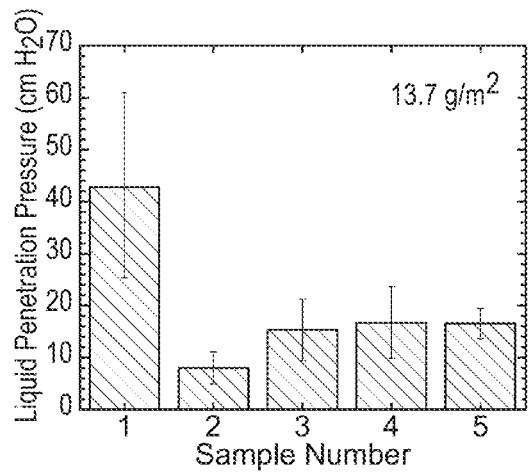
FIG. 5(a) shows the hydrohead for five varying samples after being coated with a formulation at a coating level of 13.7 g/m$^2$.
Figure 5B:
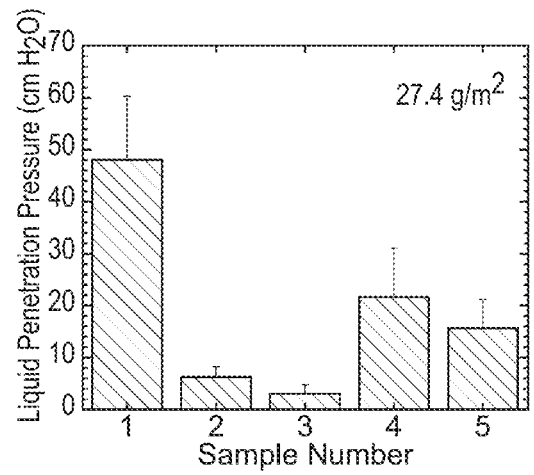
FIG. 5(b) shows the hydrohead for five varying samples after being coated with a formulation at a coating level of 27.4 g/m$^2$.

FIG. 5 shows the hydrohead for the five samples mentioned in Table 4 after being coated with Formulation I. As shown, FIG. 5a shows the effect of coating at 13.7 g/m² while FIG. 5b shows the effect of coating at 27.4 g/m².

Figure 6A:
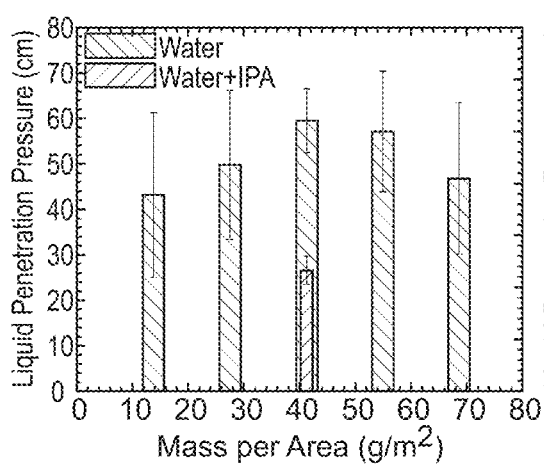
FIGS. 6(a) & 6(b) shows the hydrohead for two varying samples. Tests were performed with two probe liquids.
Figure 6B:
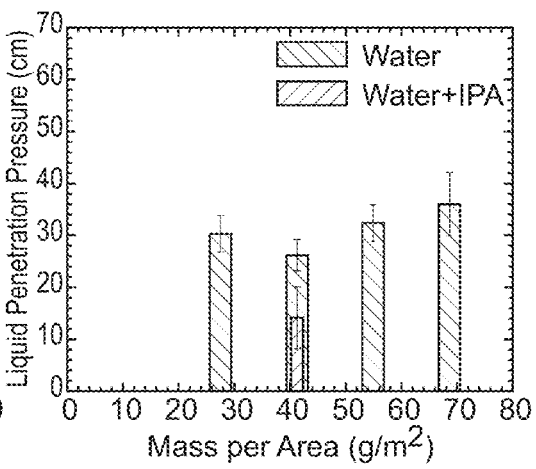

FIG. 6a shows the effect of coating level on both water and water-alcohol hydrohead heights of SMS (Sample 1) and FIG. 6b shows the Kimberly-Clark® Towel (Sample 4) surface coated with Formulation I. Each of these tests was performed with two probe liquids.

Figure 7:
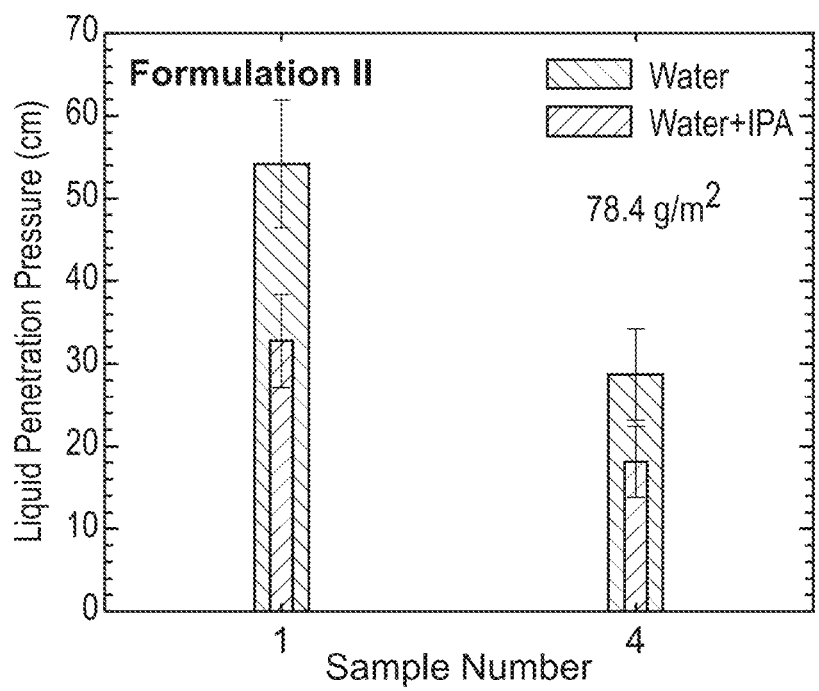
FIG. 7 shows the hydrohead for two varying samples after being coated with a formulation at a coating level of 78.4 g/m$^2$.

FIG. 7 shows the effect of Formulation II on both water and water-alcohol hydrohead height of the coated SMS (Sample 1) and Kimberly-Clark® Towel (Sample 4). The two samples were coated with Formulation II at a rate of 78.4 g/m².

Figure 8:
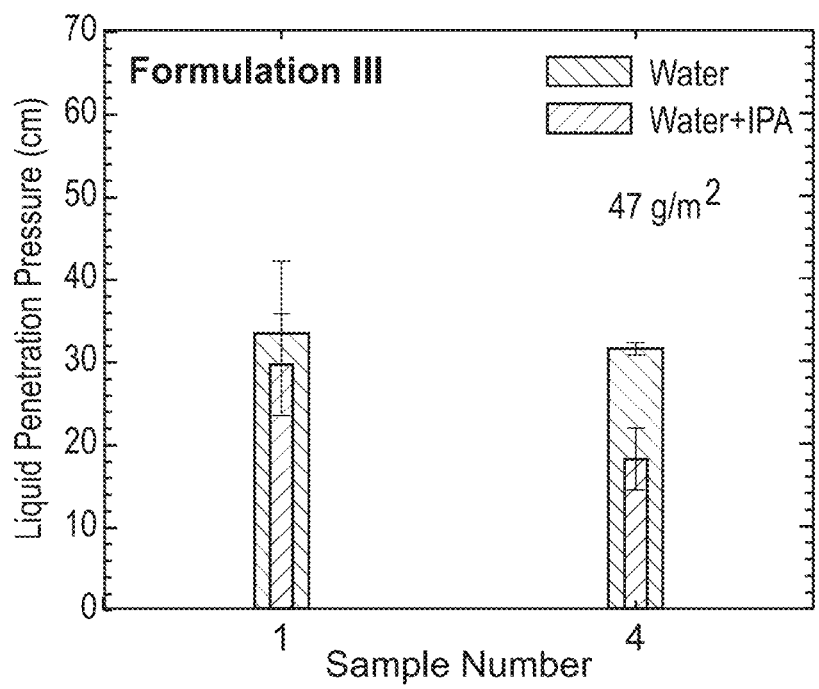
FIG. 8 shows the hydrohead for two samples coated with a formulation at a rate of 47 g/m$^2$.

FIG. 8 shows the effect of Formulation III on both water and water-alcohol hydrohead height of the coated SMS (Sample 1) and Kimberly-Clark® Towel (Sample 4). The two samples were coated with Formulation III at a rate of 47 g/m².

Figure 9:
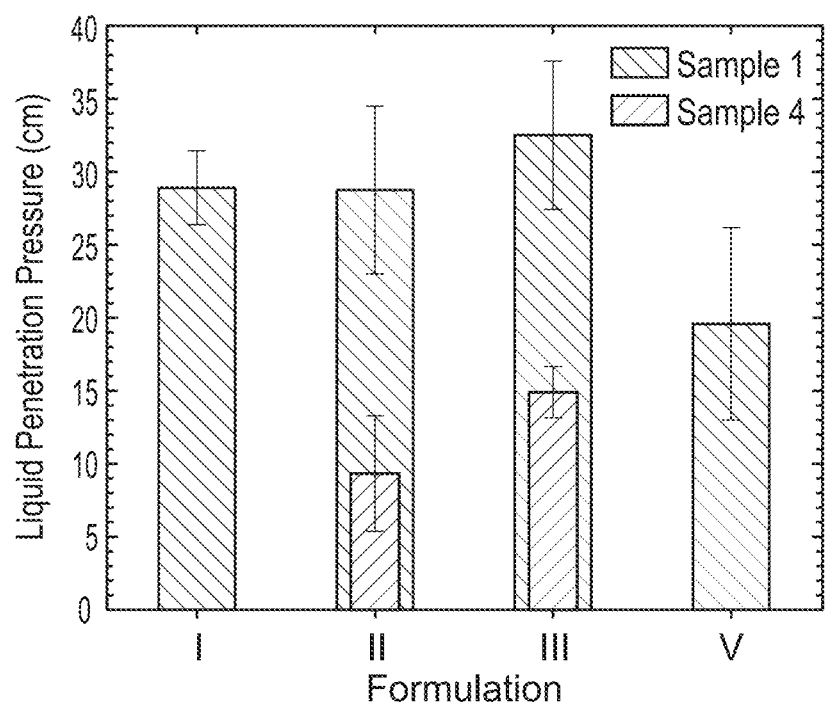
FIG. 9 shows the hydrohead for two samples coated with varying formulations. The coating levels were the minimum required for water beading, but did not guarantee measurable water penetration pressures.

FIG. 9 shows the effect of Formulations I-III and V on water hydrohead height of the coated SMS (Sample 1) and Kimberly-Clark® Towel (Sample 4). It is noted that the coating level applied in these tests was the minimum for which water beading could be achieved. For Formulations I and V on Sample 4, no hydrohead pressure was sustainable (i.e, the water penetrated the coated substrate even at zero applied pressure). In this particular case, the coating levels for Sample 1 were in the range 0.78-1.1 g/m², while for Sample 4 they were in the range 1.43-1.65 g/m² (the variability was due to substrate non-uniformities). These coatings were much thinner than those examined in FIG. 5, where higher hydroheads were measured for both of these samples (1 and 4).

All documents cited herein are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modification s can be made without departing from the spirit and scope of the invention. It is therefore intended to cover in the appended claims all such changes and modifications that are within the scope of this invention.

What is claimed is:

1. A superhydrophobic surface comprising a substrate treated with a superhydrophobic dispersion composition comprising:
   a. a water-dispersible hydrophobic component, wherein the hydrophobic component comprises a perfluorinated polymer modified with a comonomer;
   b. a nanoclay comprising nano-structured particles; and c. water, wherein the surface treated with the superhydrophobic dispersion has a water contact angle greater than 150°, wherein the superhydrophobic dispersion composition is free of an organic solvent, and wherein the ratio of the weight of the nanoclay to the weight of the nanoclay and the hydrophobic component is above 0.2 and less than 0.5.

2. The superhydrophobic surface of claim 1 wherein the hydrophobic component further comprises a fluorinated polymer.

3. The superhydrophobic surface of claim 1 wherein the hydrophobic component and nano-structured particles are present in an amount of from about 1.0% to about 3.0%, by weight of the dispersion.

4. The superhydrophobic surface of claim 1 wherein the water is present in an amount of from about 95% to about 99%, by weight of the composition.

5. The superhydrophobic surface of claim 1 further comprising a surfactant from about 0% to about 3%, by weight of the composition.

6. The superhydrophobic surface of claim 5 wherein the surfactants are selected from nonionic, cationic, or anionic surfactants.

7. The superhydrophobic surface of claim 1, wherein the comonomer is an ethylenically unsaturated carboxylic acid.

8. The superhydrophobic surface of claim 1 further comprising a stabilizing agent selected from the group consisting of long chain fatty acids, long chain fatty acid salts, ethylene-acrylic acid, ethylene-methacrylic acid copolymers, sulfonic acid and acetic acid.

9. The superhydrophobic surface of claim 1 further comprising a filler selected from the group consisting of milled glass, calcium carbonate, aluminum trihydrate, talc, antimony trioxide, fly ash and clays.

10. The superhydrophobic surface of claim 9 wherein the filler is present in an amount from about 0.01 to about 600 parts, by weight of the hydrophobic component.

11. The superhydrophobic surface of claim 1 wherein the composition is dispersed by means of spray.

12. The superhydrophobic surface of claim 1 wherein the surface is a nonwoven web.

13. The superhydrophobic surface of claim 1 wherein the surface is a tissue product.

14. The superhydrophobic surface of claim 1, wherein the nanoclay is a bentonite clay.

15. A superhydrophobic surface comprising a substrate treated with a superhydrophobic dispersion composition comprising:
   a. a water-dispersible hydrophobic component, wherein the hydrophobic component comprises a perfluorinated polymer modified with a comonomer;
   b. a nanoclay comprising nano-structured particles, wherein the nanoclay is a bentonite clay; and
   c. water, wherein the surface treated with the superhydrophobic dispersion has a water contact angle greater than 150°, wherein the superhydrophobic dispersion composition is free of an organic solvent, and wherein the ratio of the weight of the nanoclay to the weight of the nanoclay and the hydrophobic component is above 0.2 and less than 0.5.

* * * * *